(12) United States Patent
Kitagawa

(10) Patent No.: US 12,488,822 B2
(45) Date of Patent: Dec. 2, 2025

(54) MITIGATING DISTURBANCE OF DIGIT LINES AT PLATE EDGES

(71) Applicant: Micron Technology, Inc., Boise, ID (US)

(72) Inventor: Makoto Kitagawa, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 160 days.

(21) Appl. No.: 18/405,792

(22) Filed: Jan. 5, 2024

(65) Prior Publication Data

US 2024/0249762 A1 Jul. 25, 2024

Related U.S. Application Data

(60) Provisional application No. 63/440,248, filed on Jan. 20, 2023.

(51) Int. Cl.
*G11C 11/22* (2006.01)

(52) U.S. Cl.
CPC ........ *G11C 11/2255* (2013.01); *G11C 11/221* (2013.01); *G11C 11/2273* (2013.01)

(58) Field of Classification Search
CPC .............. G11C 11/2255; G11C 11/221; G11C 11/2273; G11C 11/22
See application file for complete search history.

(56) References Cited

U.S. PATENT DOCUMENTS

| | | | |
|---|---|---|---|
| 2003/0142565 A1* | 7/2003 | McClure ................ | G11C 29/50 365/201 |
| 2005/0122761 A1* | 6/2005 | Kang .................. | G11C 7/1021 365/145 |

* cited by examiner

*Primary Examiner* — Han Yang
(74) *Attorney, Agent, or Firm* — Holland & Hart LLP

(57) ABSTRACT

Methods, systems, and devices for mitigating disturbance of digit lines at plate edges are described. Generally, the described techniques relate to disturbance mitigation for one or more memory cells of a sub-array associated with an unselected digit lines located at an edge of the sub-array by including an additional shunt configured to selectively couple the edge digit lines with an associated plate line. For example, a central digit line may be coupled with a respective one of a first set of selection components and a respective one of a second set of selection components, while an edge digit line may be coupled with a respective one of the first set of selection components, a respective one of the second set of selection components, as well as a respective one of a third set of selection components.

20 Claims, 5 Drawing Sheets

MITIGATING DISTURBANCE OF DIGIT LINES AT PLATE EDGES

CROSS REFERENCE

The present application for patent claims priority to U.S. Patent Application No. 63/440,248 by Kitagawa, entitled "MITIGATING DISTURBANCE OF DIGIT LINES AT PLATE EDGES," filed Jan. 20, 2023, which is assigned to the assignee hereof, and which is expressly incorporated by reference herein.

TECHNICAL FIELD

The following relates to one or more systems for memory, including mitigating disturbance of digit lines at plate edges.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source. FeRAM may be able to achieve densities similar to volatile memory but may have non-volatile properties due to the use of a ferroelectric capacitor as a storage device.

DETAILED DESCRIPTION

Figure 1:
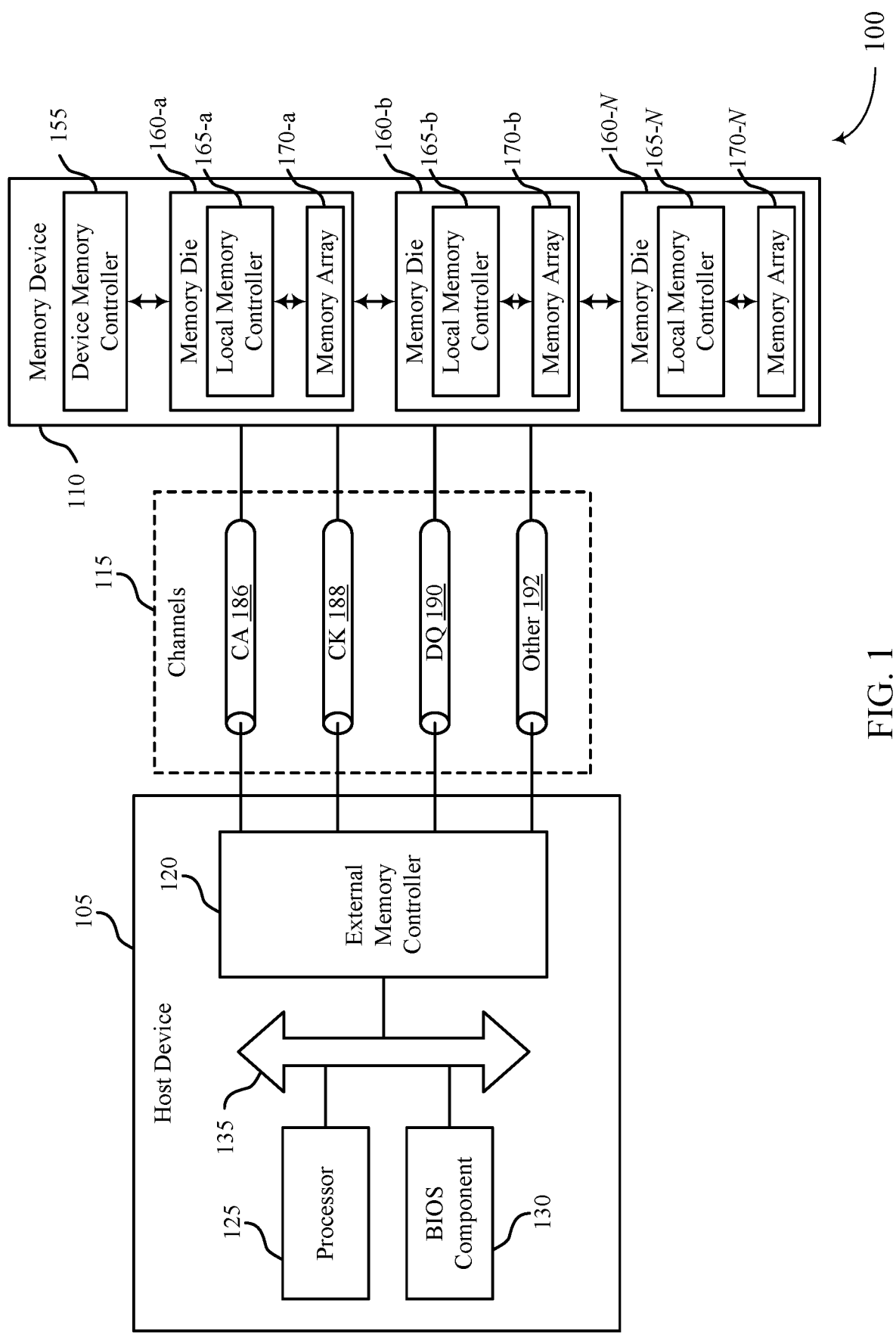
FIG. 1 illustrates an example of a system that supports mitigating disturbance of digit lines at plate edges in accordance with examples as disclosed herein.

Disturbances of unselected digit lines in a set of digit lines coupled with an array of ferroelectric memory cells during an access operation may be mitigated to improve various performance metrics for the array. For instance, disturbance experienced by memory cells in the memory array may be reduced by coupling one or more first digit lines with a plate line while performing an access operation. In some cases, a word line may be associated with one or more memory cells, and a subset of the one or more memory cells may not be accessed as part of the access operation. To reduce disturbance on the memory cells, the subset may be coupled with a shorted digit line. For example, as part of an access operation, one or more digit lines associated with the plate may be selected (e.g., selectively coupled with a sense amplifier and maintained at a static voltage), while the remaining digit lines may remain unselected (e.g., coupled with the plate line and following a variable voltage of the plate line). Additionally, During the access operation of a selected digit line, one or more of the unselected digit lines may become capacitively coupled with the selected digit line. When such capacitive coupling occurs, the one or more of the unselected digit lines may experience disturbance. That is, the one or more unselected digit lines may be delayed in reflecting a bias of the plate line during an access operation (e.g., despite being shorted to the plate line).

Additionally, a position of an unselected digit line associated with a first plate line may be related to the significance of the disturbance. For example, the first plate line may be associated with a first sub-array of memory cells and a first set of digit lines and a second plate line may be associated with a second sub-array of memory cells and a second set of digit lines. In some cases, an unselected digit line of the first set of digit lines that is adjacent to two other unselected digit lines of the first set may experience minimal disturbance (e.g., due to similar biases on either side), an unselected digit line of the first set that is adjacent to one unselected digit line of the first set and one selected digit line of the first set may experience moderate disturbance, and an unselected digit line of the first set that is adjacent to one selected digit line of the first set and a digit line of the second set of digit lines (e.g., associated with the second plate line) may experience significant disturbance.

To support disturbance mitigation for one or more memory cells associated unselected digit lines located at an edge of a sub-array associated with a plate line, an additional shunt configured to selectively couple the edge digit lines with the plate line may be added. For example, a central digit line may be coupled with a respective one of a first set of selection components (e.g., to couple the digit line with a sense amplifier) and a respective one of a second set of selection components (e.g., to couple the digit line with the plate line), while an edge digit line may be coupled with a respective one of the first set of selection components, a respective one of the second set of selection components, as well as a respective one of a third set of selection components (e.g., providing a second coupling with the plate line). By including an additional shunt at the digit lines located proximate to an edge of the plate line, the digit lines may experience reduced disturbance when adjacent to a selected digit line.

Figure 2:
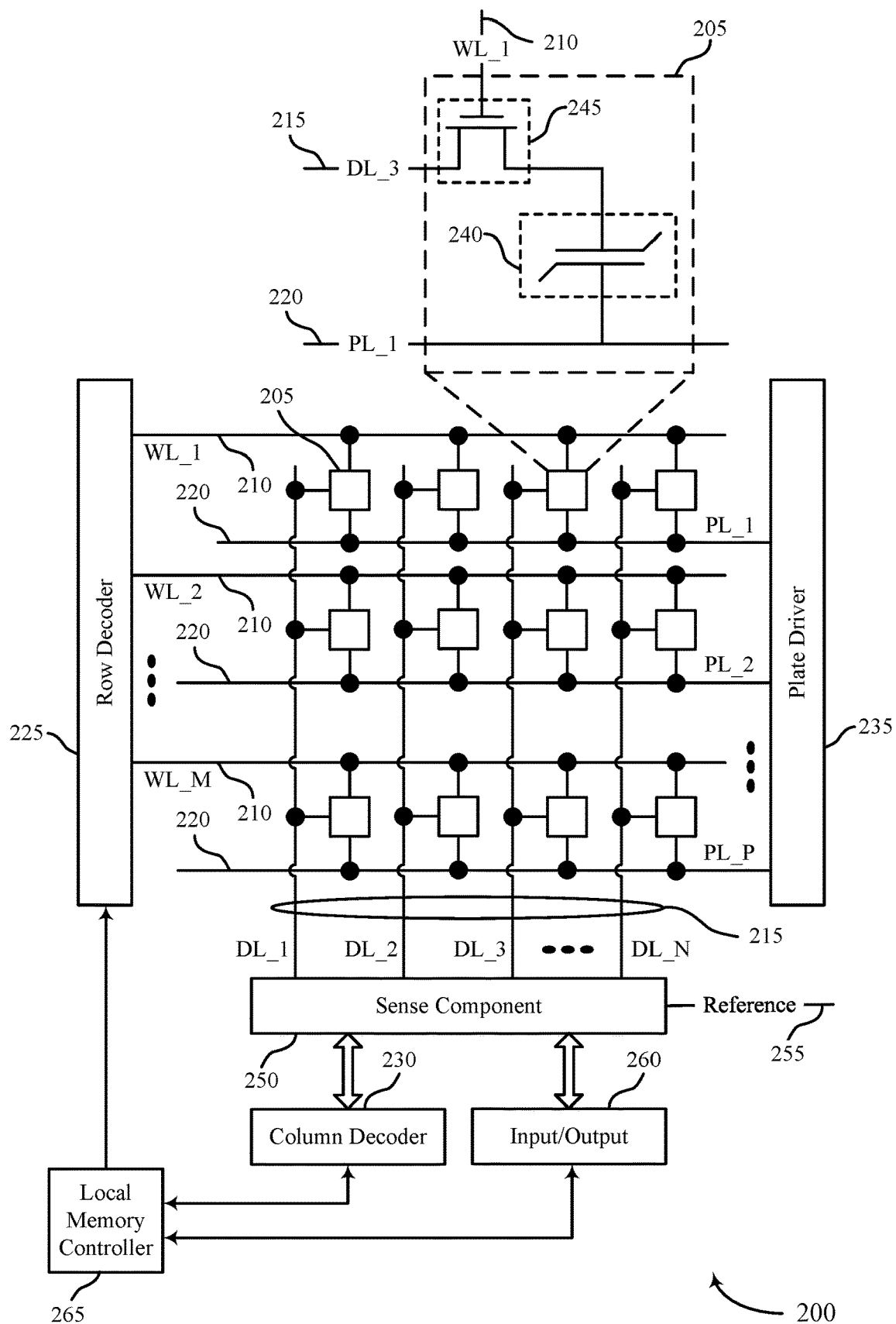
FIG. 2 illustrates an example of a memory die that supports mitigating disturbance of digit lines at plate edges in accordance with examples as disclosed herein.

Features of the disclosure are initially described in the context of systems and dies with reference to FIGS. 1 and 2. Features of the disclosure are further described in the context of system diagrams and timing diagrams with reference to FIGS. 3 through 5.

FIG. 1 illustrates an example of a system 100 that supports mitigating disturbance of digit lines at plate edges in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-$a$, memory die 160-$b$, memory die 160-N) may include a local memory controller 165 (e.g., local memory controller 165-$a$, local memory controller 165-$b$, local memory controller 165-N) and a memory array 170 (e.g., memory array 170-$a$, memory array 170-$b$, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

A memory die 160 may be an example of a two-dimensional (2D) array of memory cells or may be an example of a three-dimensional (3D) array of memory cells. In some examples, a 2D memory die 160 may include a single memory array 170. In some examples, a 3D memory die 160 may include two or more memory arrays 170, which may be stacked on top of one another or positioned next to one another (e.g., relative to a substrate). In some examples, memory arrays 170 in a 3D memory die 160 may be referred to as or otherwise include different sets (e.g., decks, levels, layers, dies). A 3D memory die 160 may include any quantity of stacked memory arrays 170 (e.g., two high, three high, four high, five high, six high, seven high, eight high). In some 3D memory dies 160, different decks may share a common access line such that some decks may share one or more of a word line, a digit line, or a plate line.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

A local memory control 165 may perform access operations on memory cells of a corresponding memory array 170. To perform the access operations, the local memory controller 165 may select one or more digit lines of a set of digit lines coupled with a plate line by coupling the one or more selected digit lines with a respective sense-amplifier. In some cases, unselected digit lines (e.g., coupled with the plate line) may experience disturbance due to capacitive coupling with the one or more selected digit lines. Further, unselected digit lines located proximate to an edge of the plate line may experience increased effective capacitance when adjacent to a selected digit line. For example, digit lines on both sides of the edge digit line (e.g., the selected digit line and a digit line of a grounded second plate line) may contribute to the capacitance experienced by the unselected edge digit. According to various aspects, an extra shunt may be added to the edge digit lines of a given plate line in order to improve the rate at which the edge digit lines reflect a change in the charge of the plate line.

FIG. 2 illustrates an example of a memory die 200 that supports mitigating disturbance of digit lines at plate edges in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a state (e.g., a polarization state, a dielectric charge) representative of the programmable states in a capacitor. The memory cell 205 may include a logic storage component, such as capacitor 240, and a switching component 245 (e.g., a cell selection component). A first node of the capacitor 240 may be coupled with the switching component 245 and a second node of the capacitor 240 may be coupled with a plate line 220. The switching component 245 may be an example of a transistor or any other type of switch device that selectively establishes or de-establishes electronic communication between two components. In FeRAM architectures, the memory cell 205 may include a capacitor 240 (e.g., a ferroelectric capacitor) that includes a ferroelectric material to store a charge (e.g., a polarization) representative of the programmable state.

The memory die 200 may include access lines (e.g., word lines 210, digit lines 215, plate lines 220) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, bit lines, or plate lines, or their analogues, are interchangeable without loss of understanding. Memory cells 205 may be positioned at intersections of the word lines 210, the digit lines 215, or the plate lines 220.

Operations such as reading and writing may be performed on memory cells 205 by activating access lines such as a word line 210, a digit line 215, or a plate line 220. By biasing a word line 210, a digit line 215, and a plate line 220 (e.g., applying a voltage to the word line 210, digit line 215, or plate line 220), a single memory cell 205 may be accessed at their intersection. The intersection of a word line 210 and a digit line 215 in a two-dimensional or in a three-dimensional configuration may be referred to as an address of a memory cell 205. Activating a word line 210, a digit line 215, or a plate line 220 may include applying a voltage to the respective line.

Accessing the memory cells 205 may be controlled through a row decoder 225, a column decoder 230, or a plate driver 235, or any combination thereof. For example, a row decoder 225 may receive a row address from the local memory controller 265 and activate a word line 210 based on the received row address. A column decoder 230 may receive a column address from the local memory controller 265 and activate a digit line 215 based on the received column address. A plate driver 235 may receive a plate address from the local memory controller 265 and activate a plate line 220 based on the received plate address.

Selecting or deselecting the memory cell 205 may be accomplished by activating or deactivating the switching component 245. The capacitor 240 may be in electronic communication with the digit line 215 using the switching component 245. For example, the capacitor 240 may be isolated from digit line 215 when the switching component 245 is deactivated, and the capacitor 240 may be coupled with digit line 215 when the switching component 245 is activated.

A word line 210 may be a conductive line in electronic communication with a memory cell 205 that is used to perform access operations on the memory cell 205. In some architectures, the word line 210 may be in electronic communication with a gate of a switching component 245 of a memory cell 205 and may be operable to control the switching component 245 of the memory cell. In some architectures, the word line 210 may be in electronic communication with a node of the capacitor of the memory cell 205 and the memory cell 205 may not include a switching component.

A digit line 215 may be a conductive line that couples the memory cell 205 with a sense component 250. In some architectures, the memory cell 205 may be selectively coupled with the digit line 215 during portions of an access operation. For example, the word line 210 and the switching component 245 of the memory cell 205 may be operable to selectively couple or isolate the capacitor 240 of the memory cell 205 and the digit line 215. In some architectures, the memory cell 205 may be in electronic communication (e.g., constant) with the digit line 215.

A plate line 220 may be a conductive line in electronic communication with a memory cell 205 that is used to perform access operations on the memory cell 205. The plate line 220 may be in electronic communication with a node (e.g., the cell bottom) of the capacitor 240. The plate line 220 may cooperate with the digit line 215 to bias the capacitor 240 during access operation of the memory cell 205.

The sense component 250 may determine a state (e.g., a polarization state, a charge) stored on the capacitor 240 of the memory cell 205 and determine a logic state of the memory cell 205 based on the detected state. The sense component 250 may include one or more sense amplifiers to amplify the signal output of the memory cell 205. The sense component 250 may compare the signal received from the memory cell 205 across the digit line 215 to a reference 255 (e.g., a reference voltage, a reference line). The detected logic state of the memory cell 205 may be provided as an output of the sense component 250 (e.g., to an input/output 260), and may indicate the detected logic state to another component of a memory device (e.g., a memory device 110) that includes the memory die 200.

The local memory controller 265 may control the operation of memory cells 205 through the various components (e.g., row decoder 225, column decoder 230, plate driver 235, and sense component 250). The local memory controller 265 may be an example of the local memory controller 165 described with reference to FIG. 1. In some examples, one or more of the row decoder 225, column decoder 230, and plate driver 235, and sense component 250 may be co-located with the local memory controller 265. The local memory controller 265 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 265 may generate row signals and column address signals to activate the target word line 210, the target digit line 215, and the target plate line 220. The local memory controller 265 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 265 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 265 in response to various access commands (e.g., from a host device 105). The local memory controller 265 may be operable to perform other access operations not listed here or other operations related to the operating of the memory die 200 that are not directly related to accessing the memory cells 205.

The local memory controller 265 may be operable to perform a write operation (e.g., a programming operation) on one or more memory cells 205 of the memory die 200. During a write operation, a memory cell 205 of the memory die 200 may be programmed to store a desired state (e.g., logic state, charge state). The local memory controller 265 may identify a target memory cell 205 on which to perform the write operation. The local memory controller 265 may identify a target word line 210 and a target digit line 215 coupled with the target memory cell 205 (e.g., an address of the target memory cell 205). The local memory controller 265 may activate the target word line 210 and the target digit line 215 (e.g., applying a voltage to the word line 210 or digit line 215) to access the target memory cell 205. The local memory controller 265 may apply a signal (e.g., a write pulse, a write voltage) to the digit line 215 during the write operation to store a specific state (e.g., charge) in the capacitor 240 of the memory cell 205. The signal used as part of the write operation may include one or more voltage levels over a duration.

The local memory controller 265 may be operable to perform a read operation (e.g., a sense operation) on one or more memory cells 205 of the memory die 200. During a read operation, the state (e.g., logic state, charge state, polarization state) stored in a memory cell 205 of the memory die 200 may be evaluated (e.g., read, determined, identified). The local memory controller 265 may identify a target memory cell 205 on which to perform the read operation. The local memory controller 265 may identify a target word line 210, a target digit line 215, and target plate line 220 coupled with the target memory cell 205. The local memory controller 265 may activate the target word line 210, the target digit line 215, and the target plate line 220 (e.g., applying a voltage to the word line 210, digit line 215, or plate line 220) to access the target memory cell 205. The target memory cell 205 may transfer a signal (e.g., charge, voltage) to the sense component 250 in response to biasing the access lines. The sense component 250 may amplify the signal. The local memory controller 265 may activate the sense component 250 (e.g., latch the sense component) and compare the signal received from the memory cell 205 to a reference (e.g., the reference 255). Based on that comparison, the sense component 250 may determine a logic state that is stored on the memory cell 205.

In some cases, as part of an access operation, the local memory controller 265 may short one or more digit lines 215 to an associated target plate line 220. For example, a target plate line 220 may be associated with quantity of N digit lines 215 and K sense components 250. The access operation may designate one or more of the digit lines 215 as target digit lines 215 and the local memory controller 265 may couple the target digit lines 215 with an appropriate component (e.g., a sense component 250)). For example, the local memory controller 265 may multiplex a set of N/K digit lines 215 such that one digit line 215 of each set is coupled with a sense component 250. In such cases, the local memory controller 265 may also selectively couple the remaining digit lines 215 with the target plate line 220, which may mitigate disturbance on one or more memory cells coupled with a target word line 210, a target digit line 215, or both (e.g., maintain a constant voltage across one or more unselected memory cells on a same word line 210 as one or more selected memory cells). However, the unselected digit lines 215 may experience a greater effective capacitance when located adjacent to selected digit lines 215, grounded digit lines 215 (e.g., associated with an unselected plate line 220), or both. That is, an unselected digit line 215 may experience significant capacitance when affected by capacitive coupling on either side of the unselected digit line 215, due to the unselected digit line being located proximate to an edge of the target plate line 220. To mitigate such capacitance, an additional shunt may be implemented on a side opposite other coupling components to provide a second coupling of the unselected digit line 215 with the target plate line 220. By driving the coupling of the unselected digit line 215 with the target plate line 220 from either end, the unselected digit line 215 may experience reduced disturbance from capacitive coupling.

Figure 3:
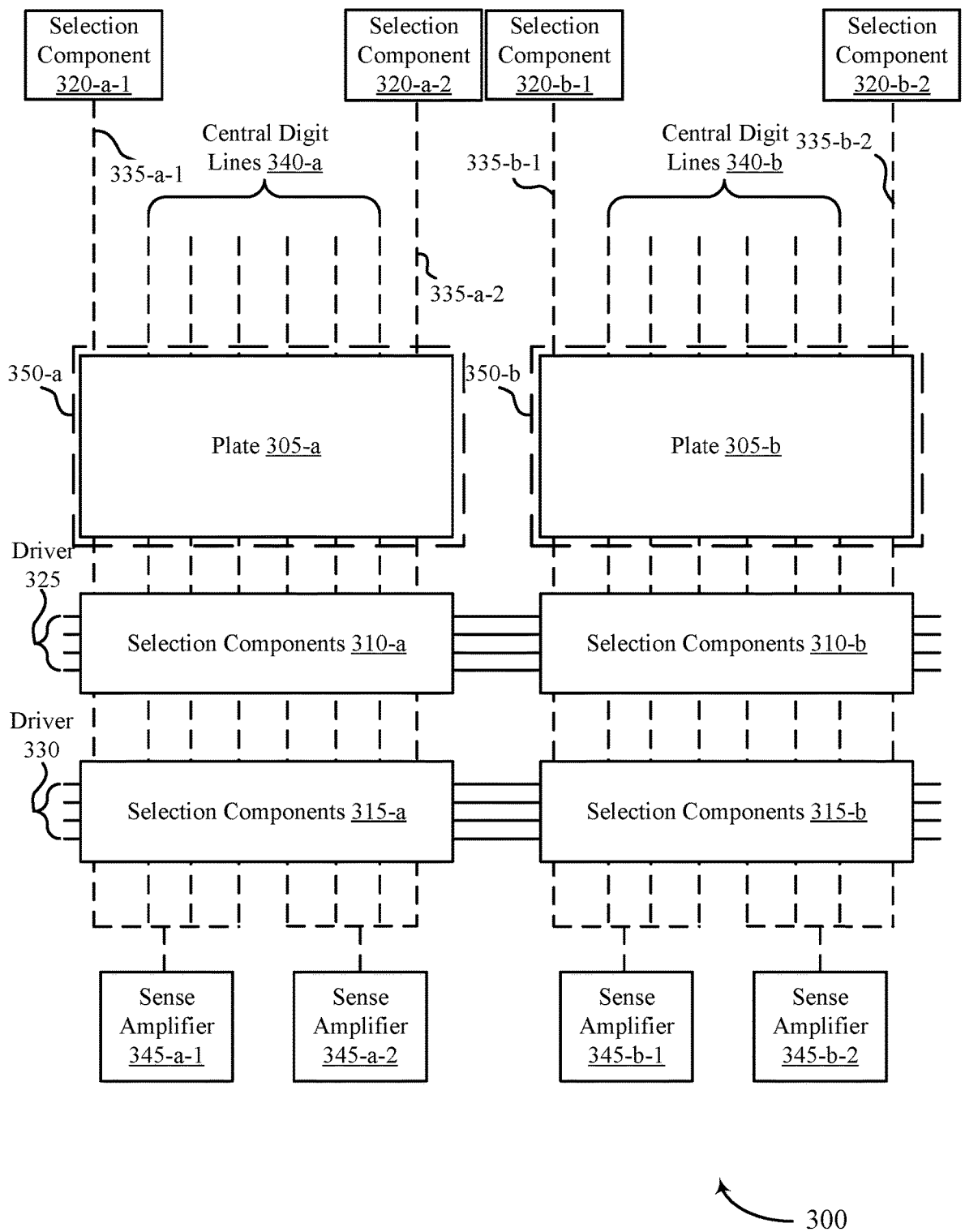
FIG. 3 illustrates an example of a system that supports mitigating disturbance of digit lines at plate edges in accordance with examples as disclosed herein.

FIG. 3 illustrates an example of a system 300 that supports mitigating disturbance of digit lines at plate edges in accordance with examples as disclosed herein. The system 300 may implement one or more aspects of the system 100 and the memory die 200. For instance, the system 300 may include multiple sub-arrays 350 (e.g., a sub-array 350-a and a sub-array 350-b), which may be examples of memory cell arrays included in a memory array 170, as described with reference to FIG. 1. The system 300 may further include a plate 305-a and a plate 305-b, which may be examples of plate lines driven by the plate driver 235 as described with reference to FIG. 2. In some cases, the system 300 may depict the usage of an additional shunt configured to selectively couple one or more digit lines 335 that are located proximate to an edge of a corresponding sub-array 350, which may reduce disturbance experienced by the digit lines 335.

The plates 305 may be associated with respective sub-arrays 350 of memory cells and respective sets of digit lines which facilitate access operations on the corresponding sub-array 350. During an access operation of a memory cell, a digit line may be selected. For example, as part of a read operation, a selected digit line may be coupled with a corresponding sense amplifier 345. In some cases, a set of selection components 310 may be configured to selectively couple each of a set of selected digit lines with an appropriate sense amplifier 345. A driver 325 may activate one or more of a set of selection components 310-a and a set of selection components 310-b in order to couple a sense amplifier 345-a-1, a sense amplifier 345-a-2 (e.g., associated with the sub-array 350-a), a sense amplifier 345-b-1, and a sense amplifier 345-b-2 (e.g., associated with the sub-array 350-b) with respective selected digit lines. For examples, for a quantity of N digit lines and a quantity of K sense amplifiers 345, each sense amplifier 345 may be associated with a group of N/K digit lines, where the selection components 310 may selectively couple one digit line of each group with the respective sense amplifier 345. In some cases, a line of the driver 325 may be configured to activate a same corresponding digit line of each group (e.g., selected digit lines may be equally spaced across the groups).

In order to avoid disturbance on one or more memory cells associated with a selected digit line or a selected word line, remaining unselected digit lines may be selectively coupled with a respective plate 305 (e.g., via selection component 315-a and selection component 315-b). A driver 330 may activate one or more of a set of selection components 310-a to selectively couple the plate 305-a with associated unselected digit lines (e.g., one or more of the edge digit lines 335-a and the central digit lines 340-a) and may activate one or more of a set of selection components 310-b to selectively couple the plate 305-b with associated unselected digit lines (e.g., one or more of the edge digit lines 335-b and the central digit lines 340-b).

In some cases, during an access operation, a selected digit line may be maintained at a first bias of the coupled sense amplifier 345 while an unselected digit line may follow a variable second bias of the coupled plate 305. Further, when one or more digit lines of a first plate 305 (e.g., the plate 305-a) are selected as part of an access operation, the digit lines of other plates 305 (e.g., the plate 305-b) may each be maintained at a third bias (e.g., grounded or virtually grounded). In some cases, an edge digit line 335 may experience increased effective capacitance when adjacent to a selected digit line. For example, if a right-most digit line of the central digit lines 340-a (with respect to the depiction of the system 300) is selected and the digit lines of the plate 305-b are each grounded, the edge digit line 335-a-2 (e.g., shorted to the plate 305-a) may experience significant capacitance due to neither adjacent digit line following a similar bias as the edge digit line 335-a-2.

To mitigate such capacitance on the edge digit lines 335, a set of selection components 320 may be added to each sub-array to provide a second coupling to the respective plate 305. In some cases, the selection components 320 may be located on a side of the sub-array that is opposite a side of the selection components 310 and the selection components 315. By placing the selection components 320 on the opposite side, a resistance-capacitance (RC) delay associated with capacitance experienced by the edge digit lines 335 may be mitigated. For example, driving the edge digit lines 335 from either end of the edge digit lines 335 may reduce the RC delay (e.g., as opposed to increasing a strength or size of a selection component 310 on one side of a sub-array 350). The set of selection components 320 may be activated by the driver 330 (e.g., activated concurrently with a selection component of the respective set of selection components 310) to couple the edge digit lines 335 with the respective plate 305 from both ends of the digit lines 335. For example, the selection component 320-a-2 may be configured to selectively couple the edge digit line 335-a-2 with the plate 305-a, from a second side, at a same time as a corresponding selection component 310-a selectively couples the edge digit line 335-a-2 with the plate 305-a from a first side. By coupling an edge digit line 335 with a respective plate 305 from both ends of the edge digit line 335, the edge digit line 335 may reflect changes to a bias of the plate 305 with reduced disturbance (e.g., RC delay).

Figure 4:
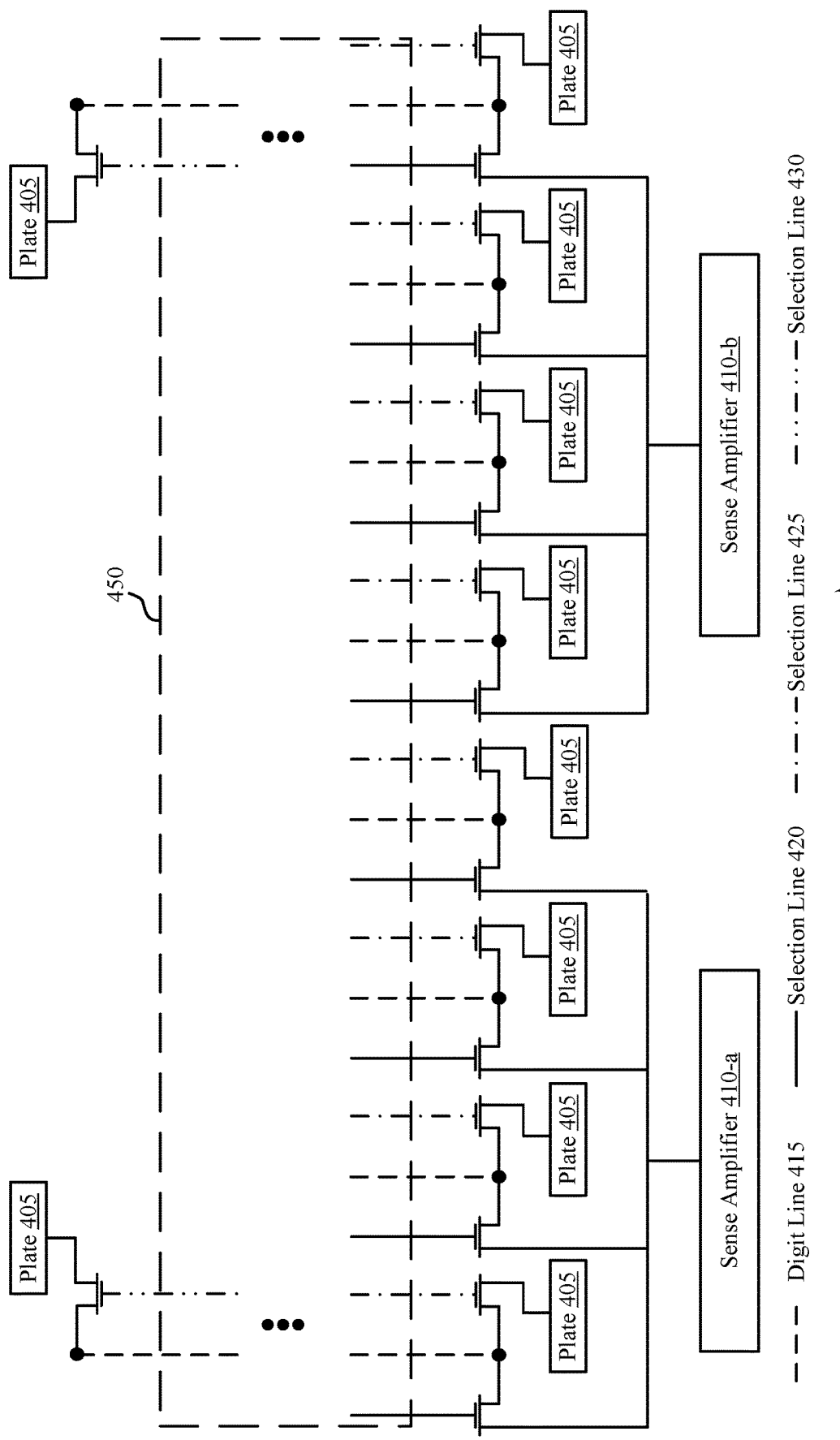
FIG. 4 illustrates an example of a system that supports mitigating disturbance of digit lines at plate edges in accordance with examples as disclosed herein.

FIG. 4 illustrates an example of a system 400 that supports mitigating disturbance of digit lines at plate edges in accordance with examples as disclosed herein. The system 400 may implement one or more aspects of the system 300. For example, the system 400 may depict an enlarged view of the connections between a plate 405, a set of sense amplifiers 410, and a set of digit lines 415 associated with a sub-array 450, which may be examples of a plate 305, sense amplifiers 345, and digit lines (e.g., edge digit lines 335 and central digit lines 340)) associated with a sub-array 350 as described with reference to FIG. 3. Further, the system 400 may include, for each digit line 415, selection lines 420 and selection lines 425, which may be examples of lines that are driven to activate selection components 310 and selection components 315, respectively, as described with reference to FIG. 3. Additionally, the system 400 may include, for each digit line 415 located proximate to an edge of the plate 405, a selection line 430, which may be examples of lines that are driven to activate selection components 320 as described with reference to FIG. 3.

A digit line 415 may be coupled with various elements of a sub-array 450 of memory cells via one or more selection components. The one or more selection components may be activated upon a corresponding selection line (e.g., a selection line 420, a selection line 425, or a selection line 430) coupled with a gate of each selection component being driven. It should be noted that while the system 400 depicts the selection components as N-channel metal-oxide semiconductor (NMOS) components (e.g., activated using a high voltage at a gate of the selection components), the system 400 may support any other suitable components, such as P-channel metal oxide semiconductor (PMOS) components (e.g., activated using a low voltage at a gate of the selection components).

In some cases, a first subset of the set of digit lines 415 may be configured to be selectively coupled, via a first set of respective selection lines 420, to a sense amplifier 410-a and a second subset of the set of digit lines 415 may be configured to be selectively coupled, via a second set of respective selection lines 420, to a sense amplifier 410-b. Further, each digit line 415 may be configured to be selectively coupled, via a set of respective selection lines 425, with the plate 405. In some examples, a corresponding digit line 415 of each of the first subset and second subset of digit lines 415 (e.g., digit lines 415 at a same index of the respective subset) may be selectively coupled with the respective sense amplifier 410, while the remaining digit lines 415 may be selectively coupled with the plate 405.

Additionally, digit lines 415 that are located proximate to an edge of the sub-array 450 may be coupled with a selection component driven by a selection line 430, in addition to the selection components driven by selection line 420 and selection line 425. A selection line 430 may be driven concurrently with a corresponding selection line 425 in order to selectively couple an edge digit line 415 with the plate 405 at both ends of the edge digit line 415. For example, when an edge digit line 415 is an unselected digit line (e.g., not selectively coupled with the sense amplifier), the edge digit line 415 may be selectively coupled with the plate 405 via two selection components that are on opposite sides of the sub-array 450 of memory cells. Such techniques may support disturbance mitigation experienced by an edge digit line 415 due to capacitive coupling with adjacent digit lines 415 on either side of the edge digit line 415 (e.g., a digit line 415 of another plate line and a selected digit line 415 coupled with a respective sense amplifier 410).

Figure 5:
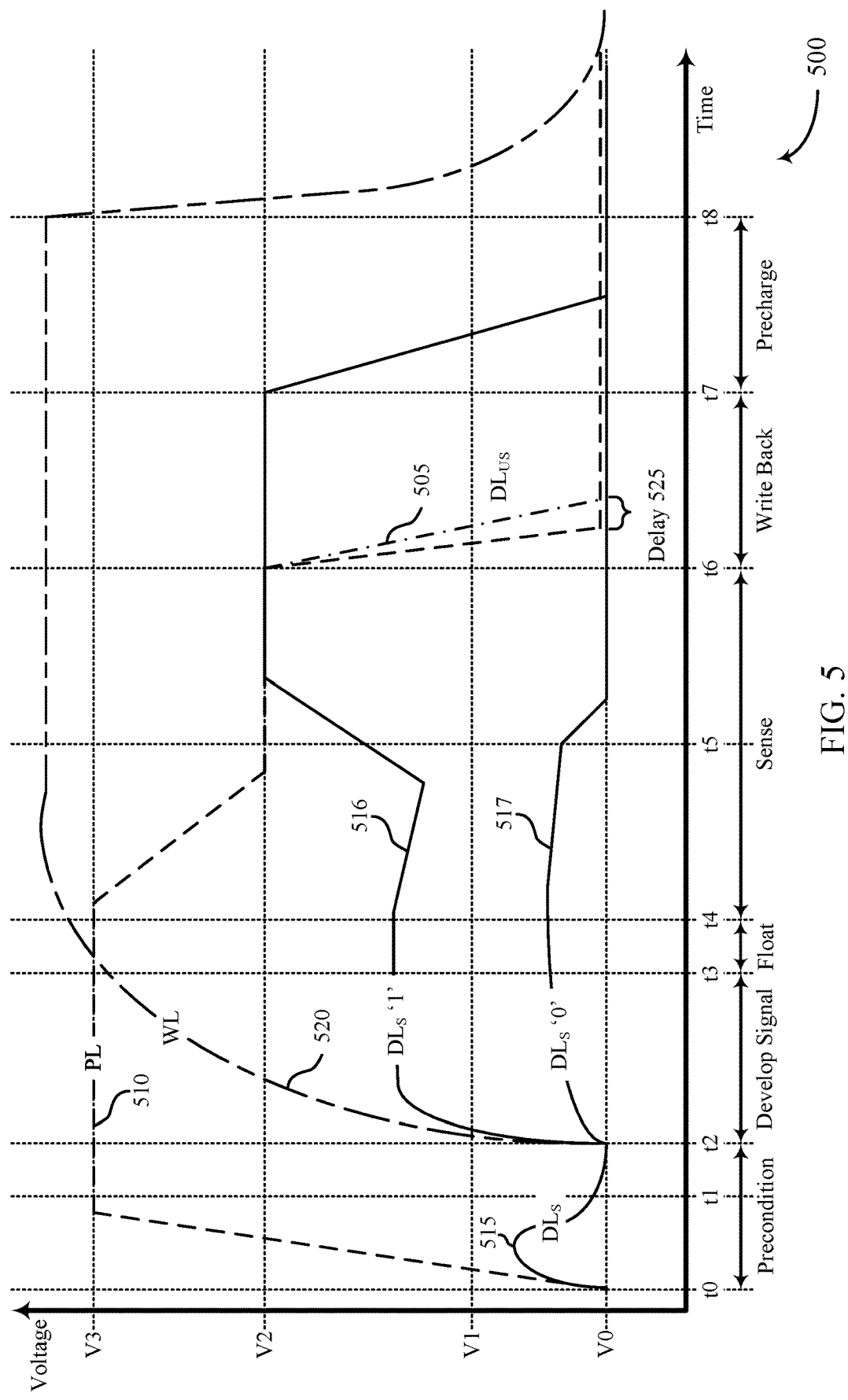
FIG. 5 illustrates an example of a timing diagram that supports mitigating disturbance of digit lines at plate edges in accordance with examples as disclosed herein.

FIG. 5 illustrates an example of a timing diagram 500 that supports mitigating disturbance of digit lines at plate edges in accordance with examples as disclosed herein. The timing diagram 500 may be implemented by one or more aspects of the system 300 and the system 400. The timing diagram 500 may include a signal trace 505 of an unselected digit line ($DL_{US}$), a signal trace 510 of a plate line (PL), a signal trace 515 of a selected digit line ($DL_S$), and a signal trace 520 of a selected word line (WL). Additionally, the timing diagram 500 may include a signal trace 516, which may represent an instance where the selected digit line stores a logic state '1', and the timing diagram 500 may include a signal trace 517, which may represent an instance where the selected digit line stores a logic state '0'. It should be noted that while the timing diagram 500 illustrates a read operation performed on a selected memory cell 205, the principles of the timing diagram 500 may be applied in the context of a write operation.

At time t0, a local memory controller 265 may cause the plate line of a plate associated with the selected memory cell 205 (e.g., signal trace 510) to go from zero voltage level V0 to a third voltage level V3 higher than the zero voltage level V0. The third voltage level V3 may be configured to bias the selected memory cell 205 during an access operation (e.g., a read operation or a write operation). Additionally, the unselected digit line (e.g., signal trace 505) may follow a bias of the plate line (e.g., due to being shorted to the plate line). For example, the unselected digit line may be coupled with the plate line using one or more selection components, which may be located on a first side of the memory cells 205, a second side of the memory cells 205, or both.

As the plate line rises to the third voltage level V3, coupling between the plate and the selected digit line may cause a voltage level of the selected digit line to rise, as represented by the selected digit line signal trace 515. Between t0 and t1, the selected digit line may be coupled with a ground or a virtual ground such that this rise in voltage level may be dissipated. At time t1, the local memory controller 265 may isolate the digit line from the ground or the virtual ground. In some instances this is accomplished by activating or deactivating a switching component.

At time t2, the local memory controller 265 may begin developing the signal from the memory cell 205. At time t2, the local memory controller 265 may activate a selection component by sending the selected word line (e.g., signal trace 520) from the zero voltage level V0 to a higher voltage level. In some examples, the higher voltage level may be greater than the third voltage level V3. By activating the selection component, a capacitor of the memory cell 205 may be coupled with the selected digit line.

At time t3, the local memory controller 265 may isolate the selected memory cell from a ground or a virtual ground thereby causing the circuit of the memory cell 205 to float. To accomplish this, the local memory controller 265 may activate or deactivate various switching components (not shown).

At time t4, the local memory controller 265 may activate a sense component (e.g., a sense amplifier 345 as described with reference to FIG. 3) to sense a logic state of the selected memory cell 205. To accomplish this, the local memory controller 265 may activate or deactivate various switching components (not shown). In addition, at time t4 the local memory controller 265 may cause the voltage level of the plate to drop to a second voltage level V2 less than the third voltage level V3, as represented by the plate line signal trace 510. Using the sense component, the local memory controller 265 may identify the logic state of the selected memory cell 205 based on the voltage level of the selected digit line (e.g., digit line signal trace 516 for a logical '1' or digit line signal trace 517 for a logical '0'). For example, the local memory controller 265 may compare the selected digit line voltage level to a reference voltage (e.g., voltage level V1). If the selected digit line is higher than the reference voltage (V1) (e.g., digit line signal trace 516), the local memory controller 265 may identify the logic state as a logical '1.' If the digit line signal is lower than the reference voltage (V1) (e.g., digit line signal trace 517), the local memory controller 265 may identify the logic state as a logical '0.'

At time t5, the local memory controller 265 activates or deactivates a number of switching components (not shown). In some cases, the digit line may vary according to the sense component evaluating the digit line and driving the digit line signals (e.g., signal traces 516 or 517) to an appropriate result (e.g., latching the signal). For example, the digit line signal trace 516 may raise to the second voltage level (V2) with the plate line (e.g., signal trace 510). In another example, the digit line signal trace 517 may drop to the zero voltage level (V0). In some examples, at time t5, the sense component may latch the memory cell 205 back to a ground or a virtual ground so that the memory cell 205 is no longer floating.

At time t6, the local memory controller 265 grounds or virtually grounds the plate such that the plate line drops to the zero voltage level (V0). Additionally, the unselected digit line signal trace 505 may reflect this voltage drop after a delay 525. The delay 525 may be due to capacitive coupling of the unselected digit line with selected or grounded digit lines adjacent to the unselected digit line. In some cases, such as when the unselected digit line is located proximate to an edge of the plate, an additional shunt may be added to further drive the unselected digit line to the plate (e.g., mitigating the duration of the delay 525).

At time t7, the local memory controller 265 may ground or virtually ground the selected digit line. In some examples, the local memory controller 265 deselects the sense component at t7.

At time t8, the local memory controller 265 completes the access operation. At time t8, the local memory controller 265 may isolate the capacitor of the memory cell 205 from the selected digit line by deactivating the selection component. The local memory controller 265 may accomplish this by causing the word line (e.g., signal trace 520) to drop to the zero voltage level (V0). The local memory controller 265 may also deselect the selected memory cell 205. The local memory controller 265 may isolate the plate from the selected digit line by deactivating the shunt switching components.

It should be noted that the methods described herein are possible implementations, and that the operations and the steps may be rearranged or otherwise modified and that other implementations are possible. Furthermore, portions from two or more of the methods may be combined.

An apparatus is described. The following provides an overview of aspects of the apparatus as described herein:

Aspect 1: An apparatus, including: a first plurality of memory cells, each memory cell of the first plurality of memory cells coupled with a first plate line; a first plurality of digit lines, each digit line of the first plurality of digit lines coupled with a respective subset of the first plurality of memory cells; a plurality of sense amplifiers located on a first side of the first plurality of memory cells; a first plurality of selection components located on the first side of the first plurality of memory cells and configured to selectively couple one of a first subset of digit lines of the first plurality of digit lines with a first sense amplifier of the plurality of sense amplifiers; a second plurality of selection components located on the first side of the first plurality of memory cells and configured to selectively couple one or more of the first subset of digit lines with the first plate line; and a third plurality of selection components located on a second side of the first plurality of memory cells and configured to selectively couple one or more of the first subset of digit lines with the first plate line.

Aspect 2: The apparatus of aspect 1, where the one or more of the first subset of digit lines are located proximate to a third side or a fourth side of the first plurality of memory cells, the third side and the fourth side including opposing sides of the first plurality of memory cells.

Aspect 3: The apparatus of aspect 2, where at least one of the first plurality of digit lines is not selectively coupled with the first plate line on the second side of the first plurality of memory cells.

Aspect 4: The apparatus of any of aspects 2 through 3, further including: a second plurality of memory cells, each memory cell of the second plurality of memory cells coupled with a second plate line, the second plurality of memory cells located adjacent to the third side of the first plurality of memory cells.

Aspect 5: The apparatus of aspect 4, further including: a third plurality of memory cells, each memory cell of the third plurality of memory cells coupled with a third plate line, the third plurality of memory cells located adjacent to the fourth side of the first plurality of memory cells.

Aspect 6: The apparatus of any of aspects 2 through 5, where each of the one or more of the first subset of digit lines are adjacent to a single other digit line of the first plurality of digit lines.

Aspect 7: The apparatus of any of aspects 1 through 6, further including: a first driver coupled with the first plurality of selection components and configured to activate the first plurality of selection components, where the first plurality of selection components are configured to selectively couple the one of the first subset of digit lines with the first sense amplifier based at least in part on the first driver activating one of the first plurality of selection components.

Aspect 8: The apparatus of aspect 7, further including: a second driver coupled with the second plurality of selection components and the third plurality of selection components, the second driver configured to activate the second plurality of selection components and the third plurality of selection components, where: the second plurality of selection components are configured to selectively couple the one or more of the first subset of digit lines to the first plate line based at least in part on the second driver activating one or more of the second plurality of selection components; and the third plurality of selection components are configured to selectively couple the one or more of the first subset of digit lines to the first plate line based at least in part on the second driver activating one or more of the third plurality of selection components.

Aspect 9: The apparatus of any of aspects 1 through 8, where the one or more of the first subset of digit lines excludes the one of the first subset of digit lines that is selectively coupled with the first sense amplifier.

An apparatus is described. The following provides an overview of aspects of the apparatus as described herein:

Aspect 10: An apparatus, including: a plurality of digit lines, each digit line of the plurality of digit lines coupled with a respective subset of a plurality of memory cells, each memory cell of the plurality of memory cells coupled with a plate line; a sense amplifier located on a first side of the plurality of memory cells; a first digit line of the plurality of digit lines, the first digit line coupled with a plurality of selection components; a first selection component of the plurality of selection components located on the first side of the plurality of memory cells and configured to selectively couple the first digit line with the sense amplifier; a second selection component of the plurality of selection components located on the first side of the plurality of memory cells and configured to selectively couple the first digit line with the plate line; and a third selection component of the plurality of selection components located on a second side of the plurality of memory cells and configured to selectively couple the first digit line with the plate line.

Aspect 11: The apparatus of aspect 10, where the first digit line is located proximate to a third side or a fourth side of the plurality of memory cells, the third side and the fourth side including opposing sides of the plurality of digit lines.

Aspect 12: The apparatus of any of aspects 10 through 11, further including: a first driver coupled with the first selection component and configured to activate the first selection component, where the first selection component is configured to selectively couple the first digit line with the sense amplifier based at least in part on the first driver activating the first selection component.

Aspect 13: The apparatus of aspect 12, further including: a second driver coupled with the second selection component and the third selection component, the second driver configured to activate the second selection component and the third selection component, where: the second selection component is configured to selectively couple the first digit line with the plate line based at least in part on the second driver activating the second selection component; and the third selection component is configured to selectively couple the first digit line with the plate line based at least in part on the second driver activating the third selection component.

Aspect 14: The apparatus of any of aspects 10 through 13, where the first digit line is coupled with the plate line via the second selection component and the third selection component based at least in part on the first digit line not being selectively coupled with the sense amplifier via the first selection component.

An apparatus is described. The following provides an overview of aspects of the apparatus as described herein:

Aspect 15: An apparatus, including: a plurality of sub-arrays of memory cells, each sub-array of the plurality of sub-arrays including a respective plurality of memory cells coupled with a respective plate line; a plurality of sets of digit lines, each set of digit lines associated with a respective sub-array of the plurality of sub-arrays; a plurality of sets of sense amplifiers, each set of sense amplifiers located on a first side of a respective sub-array; a plurality of first sets of selection components, each first set of the plurality of first sets located on the first side of a respective sub-array, where each selection component of the each first set is configured to selectively couple one of the respective set of digit lines associated with the respective sub-array with one of the respective set of sense amplifiers; a plurality of second sets of selection components, each second set of the plurality of second sets located on the first side of a respective sub-array, where each selection component of the each second set is configured to selectively couple a subset of the respective set of digit lines associated with the respective sub-array with the respective plate line; and a plurality of third sets of selection components, each third set of the plurality of third sets located on a second side of the respective sub-array, where each selection component of the each third set is configured to selectively couple one or more of the subset of the respective set of digit lines associated with the respective sub-array with the respective plate line.

Aspect 16: The apparatus of aspect 15, where the one or more of the subset of the respective set of digit lines are located on a third side or a fourth side of the respective sub-array, the third side and the fourth side including opposing sides of the respective sub-array.

Aspect 17: The apparatus of any of aspects 15 through 16, where each of the one or more of the subset of the respective set of digit lines are adjacent to a single other digit line of the first plurality of digit lines.

Aspect 18: The apparatus of any of aspects 15 through 17, further including: a first driver coupled with the plurality of first sets of selection components and configured to activate the plurality of first sets of selection components, where the each selection component of the each first set is configured to selectively couple the one of the respective set of digit lines with the one of the respective set of sense amplifiers based at least in part on the first driver activating one of the each selection component of the each first set.

Aspect 19: The apparatus of aspect 18, further including: a second driver coupled with the plurality of second sets of selection components and the plurality of third sets of selection components, the second driver configured to activate the plurality of second sets of selection components and the plurality of third sets of selection components, where: the plurality of second sets of selection components are configured to selectively couple the subset of the respective set of digit lines associated with the respective sub-array with the respective plate line based at least in part on the second driver activating the plurality of second sets of selection components; and the plurality of third sets of selection components are configured to selectively couple the one or more of the subset of the respective set of digit lines associated with the respective sub-array with the respective plate line based at least in part on the second driver activating the plurality of second sets of selection components.

Aspect 20: The apparatus of any of aspects 15 through 19, where the subset of the respective set of digit lines associated with the respective sub-array excludes the one of the respective set of digit lines associated with the respective sub-array that is selectively coupled with the one of the respective set of sense amplifiers.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

As used herein, the term "electrode" may refer to an electrical conductor, and in some examples, may be employed as an electrical contact to a memory cell or other component of a memory array. An electrode may include a trace, a wire, a conductive line, a conductive layer, or the like that provides a conductive path between components of a memory array.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary," used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a first plurality of memory cells, each memory cell of the first plurality of memory cells coupled with a first plate line;
a first plurality of digit lines, each digit line of the first plurality of digit lines coupled with a respective subset of the first plurality of memory cells;
a plurality of sense amplifiers located on a first side of the first plurality of memory cells;
a first plurality of selection components located on the first side of the first plurality of memory cells and configured to selectively couple one of a first subset of digit lines of the first plurality of digit lines with a first sense amplifier of the plurality of sense amplifiers;
a second plurality of selection components located on the first side of the first plurality of memory cells and configured to selectively couple one or more of the first subset of digit lines with the first plate line; and
a third plurality of selection components located on a second side of the first plurality of memory cells and configured to selectively couple one or more of the first subset of digit lines with the first plate line.

2. The apparatus of claim 1, wherein the one or more of the first subset of digit lines are located proximate to a third side or a fourth side of the first plurality of memory cells, the third side and the fourth side comprising opposing sides of the first plurality of memory cells.

3. The apparatus of claim 2, wherein at least one of the first plurality of digit lines is not selectively coupled with the first plate line on the second side of the first plurality of memory cells.

4. The apparatus of claim 2, further comprising:
a second plurality of memory cells, each memory cell of the second plurality of memory cells coupled with a second plate line, the second plurality of memory cells located adjacent to the third side of the first plurality of memory cells.

5. The apparatus of claim 4, further comprising:
a third plurality of memory cells, each memory cell of the third plurality of memory cells coupled with a third plate line, the third plurality of memory cells located adjacent to the fourth side of the first plurality of memory cells.

6. The apparatus of claim 2, wherein each of the one or more of the first subset of digit lines are adjacent to a single other digit line of the first plurality of digit lines.

7. The apparatus of claim 1, further comprising:
a first driver coupled with the first plurality of selection components and configured to activate the first plurality of selection components, wherein the first plurality of selection components are configured to selectively couple the one of the first subset of digit lines with the first sense amplifier based at least in part on the first driver activating one of the first plurality of selection components.

8. The apparatus of claim 7, further comprising:
a second driver coupled with the second plurality of selection components and the third plurality of selection components, the second driver configured to activate the second plurality of selection components and the third plurality of selection components, wherein:
the second plurality of selection components are configured to selectively couple the one or more of the first subset of digit lines to the first plate line based at least in part on the second driver activating one or more of the second plurality of selection components; and
the third plurality of selection components are configured to selectively couple the one or more of the first subset of digit lines to the first plate line based at least in part on the second driver activating one or more of the third plurality of selection components.

9. The apparatus of claim 1, wherein the one or more of the first subset of digit lines excludes the one of the first subset of digit lines that is selectively coupled with the first sense amplifier.

10. An apparatus, comprising:
a plurality of digit lines, each digit line of the plurality of digit lines coupled with a respective subset of a plurality of memory cells, each memory cell of the plurality of memory cells coupled with a plate line;
a sense amplifier located on a first side of the plurality of memory cells;
a first digit line of the plurality of digit lines, the first digit line coupled with a plurality of selection components;
a first selection component of the plurality of selection components located on the first side of the plurality of memory cells and configured to selectively couple the first digit line with the sense amplifier;
a second selection component of the plurality of selection components located on the first side of the plurality of memory cells and configured to selectively couple the first digit line with the plate line; and
a third selection component of the plurality of selection components located on a second side of the plurality of memory cells and configured to selectively couple the first digit line with the plate line.

11. The apparatus of claim 10, wherein the first digit line is located proximate to a third side or a fourth side of the plurality of memory cells, the third side and the fourth side comprising opposing sides of the plurality of digit lines.

12. The apparatus of claim 10, further comprising:
a first driver coupled with the first selection component and configured to activate the first selection component, wherein the first selection component is configured to selectively couple the first digit line with the sense amplifier based at least in part on the first driver activating the first selection component.

13. The apparatus of claim 12, further comprising:
a second driver coupled with the second selection component and the third selection component, the second driver configured to activate the second selection component and the third selection component, wherein:

the second selection component is configured to selectively couple the first digit line with the plate line based at least in part on the second driver activating the second selection component; and
the third selection component is configured to selectively couple the first digit line with the plate line based at least in part on the second driver activating the third selection component.

14. The apparatus of claim 10, wherein the first digit line is coupled with the plate line via the second selection component and the third selection component based at least in part on the first digit line not being selectively coupled with the sense amplifier via the first selection component.

15. An apparatus, comprising:
a plurality of sub-arrays of memory cells, each sub-array of the plurality of sub-arrays comprising a respective plurality of memory cells coupled with a respective plate line;
a plurality of sets of digit lines, each set of digit lines associated with a respective sub-array of the plurality of sub-arrays;
a plurality of sets of sense amplifiers, each set of sense amplifiers located on a first side of a respective sub-array;
a plurality of first sets of selection components, each first set of the plurality of first sets located on the first side of a respective sub-array, wherein each selection component of the each first set is configured to selectively couple one of the respective set of digit lines associated with the respective sub-array with one of the respective set of sense amplifiers;
a plurality of second sets of selection components, each second set of the plurality of second sets located on the first side of a respective sub-array, wherein each selection component of the each second set is configured to selectively couple a subset of the respective set of digit lines associated with the respective sub-array with the respective plate line; and
a plurality of third sets of selection components, each third set of the plurality of third sets located on a second side of the respective sub-array, wherein each selection component of the each third set is configured to selectively couple one or more of the subset of the respective set of digit lines associated with the respective sub-array with the respective plate line.

16. The apparatus of claim 15, wherein the one or more of the subset of the respective set of digit lines are located on a third side or a fourth side of the respective sub-array, the third side and the fourth side comprising opposing sides of the respective sub-array.

17. The apparatus of claim 15, wherein each of the one or more of the subset of the respective set of digit lines are adjacent to a single other digit line of the first plurality of digit lines.

18. The apparatus of claim 15, further comprising:
a first driver coupled with the plurality of first sets of selection components and configured to activate the plurality of first sets of selection components, wherein the each selection component of the each first set is configured to selectively couple the one of the respective set of digit lines with the one of the respective set of sense amplifiers based at least in part on the first driver activating one of the each selection component of the each first set.

19. The apparatus of claim 18, further comprising:
a second driver coupled with the plurality of second sets of selection components and the plurality of third sets of selection components, the second driver configured to activate the plurality of second sets of selection components and the plurality of third sets of selection components, wherein:

the plurality of second sets of selection components are configured to selectively couple the subset of the respective set of digit lines associated with the respective sub-array with the respective plate line based at least in part on the second driver activating the plurality of second sets of selection components; and the plurality of third sets of selection components are configured to selectively couple the one or more of the subset of the respective set of digit lines associated with the respective sub-array with the respective plate line based at least in part on the second driver activating the plurality of second sets of selection components.

20. The apparatus of claim 15, wherein the subset of the respective set of digit lines associated with the respective sub-array excludes the one of the respective set of digit lines associated with the respective sub-array that is selectively coupled with the one of the respective set of sense amplifiers.

\* \* \* \* \*